United States Patent [19]
Risley

[11] 3,929,218
[45] Dec. 30, 1975

[54] MODULATED SPEED CONTROL FOR A CONVEYING SYSTEM

[75] Inventor: Robert F. Risley, Wauwatosa, Wis.

[73] Assignee: Jos. Schlitz Brewing Company, Milwaukee, Wis.

[22] Filed: May 1, 1974

[21] Appl. No.: 465,915

[52] U.S. Cl. .................... 198/37; 198/76; 251/294
[51] Int. Cl.² .......................................... B65G 43/08
[58] Field of Search ............. 198/37, 76, 203, 182; 251/294

[56] References Cited
UNITED STATES PATENTS

| | | | |
|---|---|---|---|
| 2,674,853 | 4/1954 | Born | 198/203 |
| 2,745,537 | 5/1956 | Cadman | 198/37 X |
| 2,805,784 | 9/1957 | Dokken | 198/203 X |
| 2,936,060 | 5/1960 | Carter | 198/37 X |
| 3,109,529 | 11/1963 | Carter | 198/37 X |
| 3,596,752 | 8/1971 | Garvey | 198/182 |
| 3,625,340 | 12/1971 | McCombie | 198/37 |

*Primary Examiner*—Evon C. Blunk
*Assistant Examiner*—Douglas D. Watts
*Attorney, Agent, or Firm*—Andrus, Sceales, Starke & Sawall

[57] ABSTRACT

A conveying system having a modulated speed control that is responsive to the flow of articles on the system. The conveying system includes a pair of conveyors and a spring loaded cable is mounted along one side of one of the conveyors and is capable of deflecting laterally in response to a pressure generated by an accumulation of articles on the conveyor. The cable is operably connected to a valve of a hydraulic motor which drives the second conveyor that is located upstream of the first conveyor. If a blockage occurs downstream, the articles will accumulate on the first conveyor causing the cable to flex, and flexing of the cable will operate the valve to vary the flow of hydraulic fluid to the hydraulic motor for the second upstream conveyor, thereby either decreasing the speed of the upstream conveyor or stopping operation of that conveyor. As the accumulation of articles on the first conveyor is returned to the conveying system, the cable will return to a taut condition to thereby operate the valve to correspondingly increase the speed of the hydraulic motor of the upstream conveyor.

12 Claims, 7 Drawing Figures

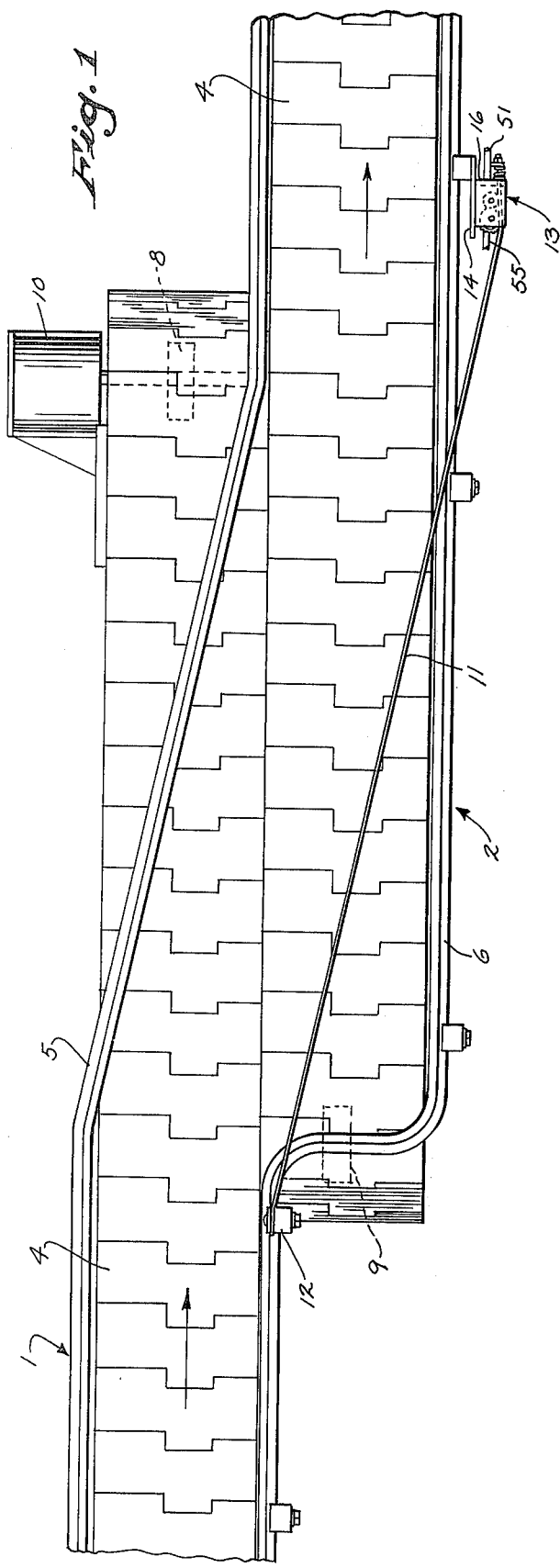

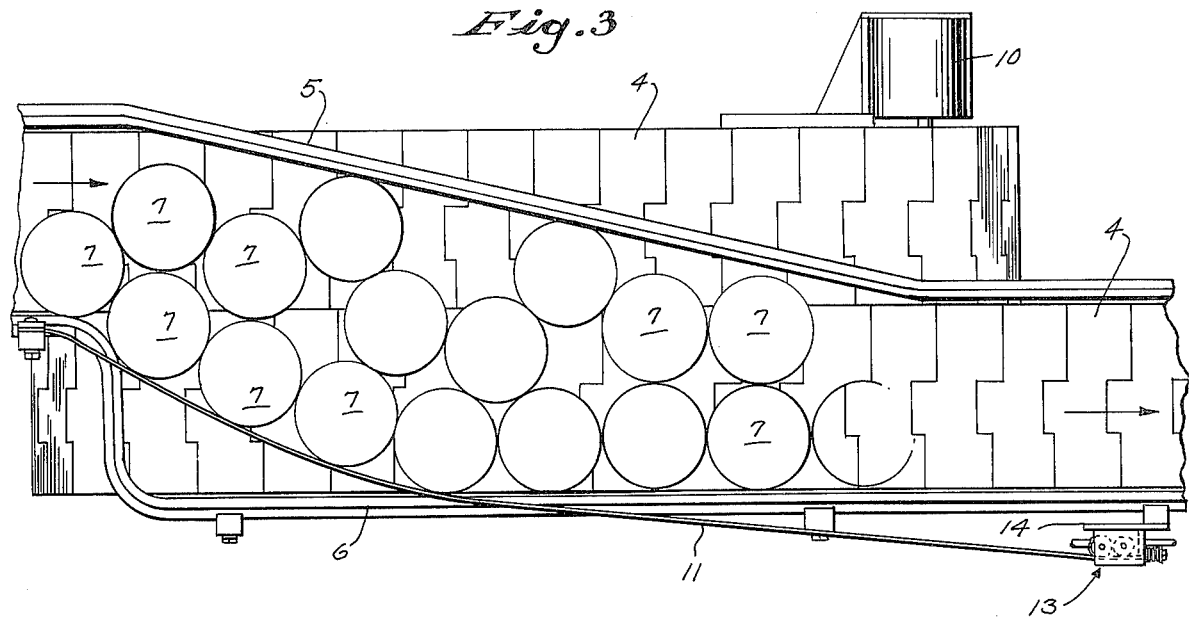
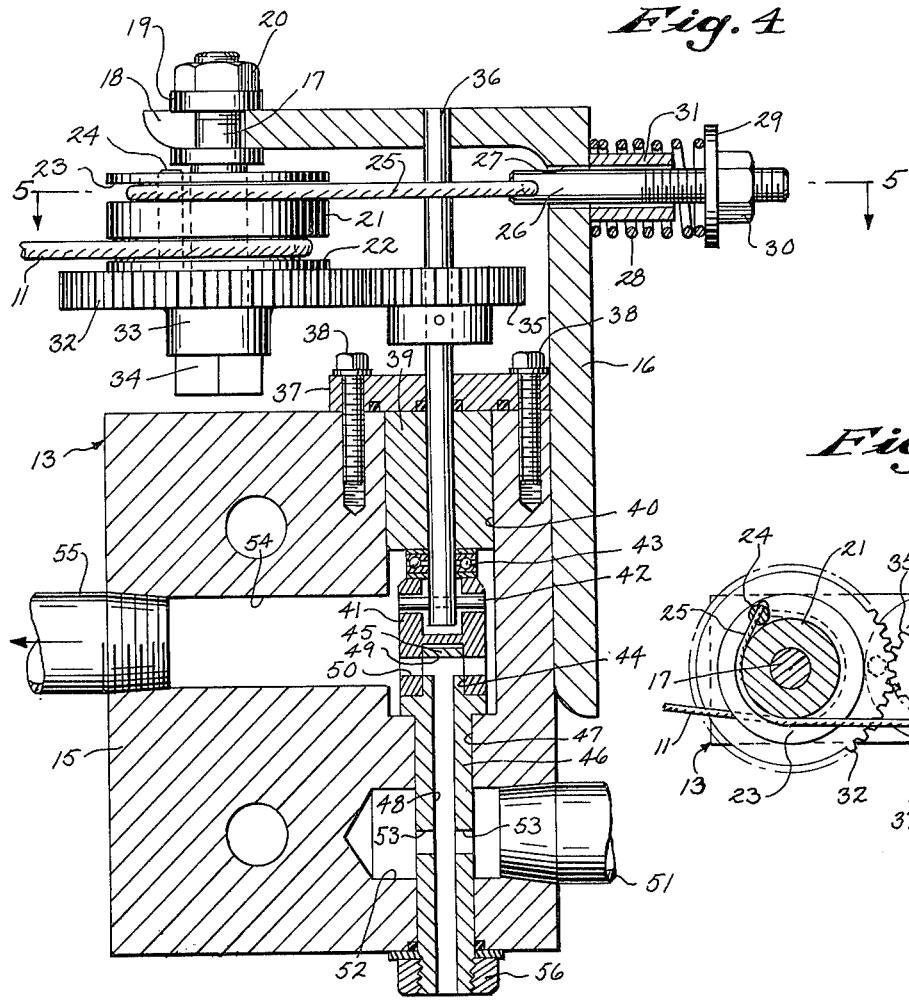
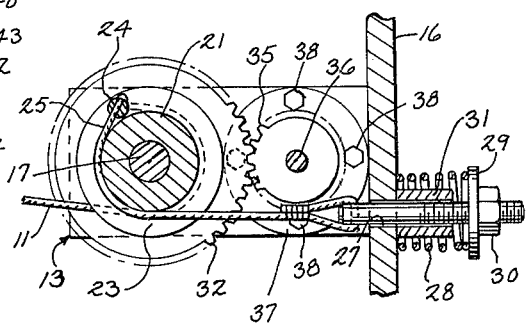

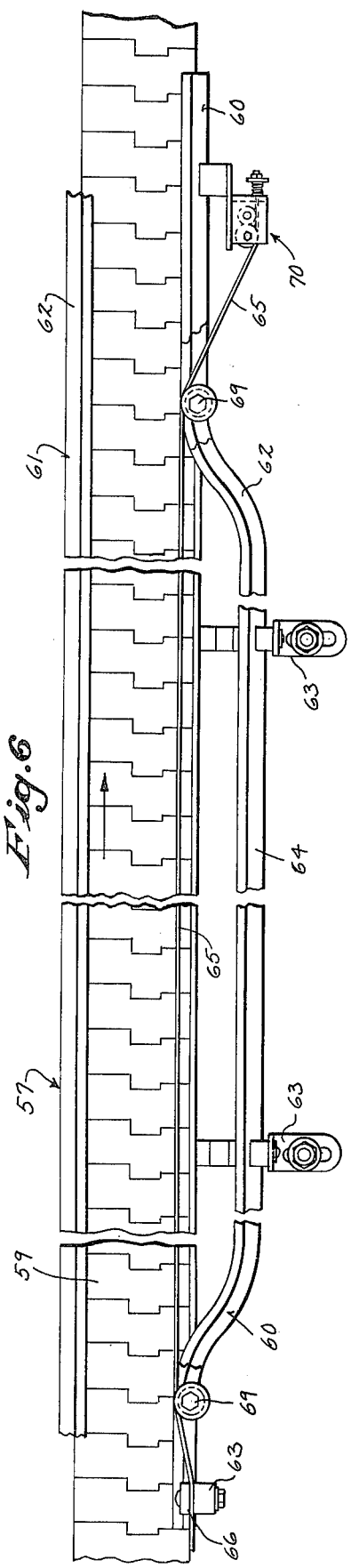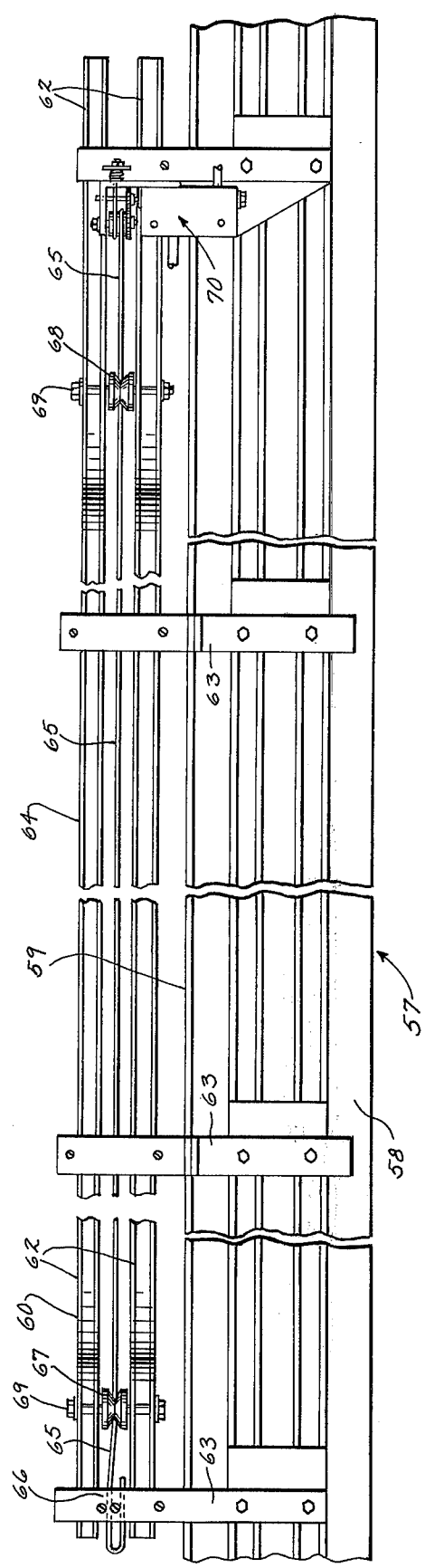

MODULATED SPEED CONTROL FOR A CONVEYING SYSTEM

BACKGROUND OF THE INVENTION

In the brewing industry, the cans or bottles are moved through the filling and packaging macines by a series of high speed conveyors. For efficiency in operation, it is desired that the filling machine run continuously without interruption. However, because the packaging machine is dealing with a paper product, such as cartons and cases, malfunction or clogging may occassionally occur which results in the shut down of the packaging machine. In the event of such a stoppage downstream, the cans or bottles will backup or accumulate on the conveyor system, and most conveyor systems include controls which will sense an accumulation and stop the upstream conveyors until the blockage is cured.

The sensors that have been used in the past have generally been pressure-sensitive switches which operate through an electrical system to control the electric motors which operate the upstream conveyors. Not only is a system like this expensive to install, but the system is generally one that operates on an on-off principle and it is not possible to modulate or vary the speed of the upstream conveyors in accordance with the magnitude of the accumulation.

SUMMARY OF THE INVENTION

The present invention is directed to a modulated speed control for a conveyor system that is responsive to the flow of articles on the conveying system. In accordance with the invention, the conveying system includes a pair of conveyors, with one of the conveyors being located downstream of the other. A spring loaded cable or belt is positioned along a side of the downstream conveyor and the cable is operably connected to a control valve for a hydraulic motor associated with the upstream conveyor. The cable is capable of flexing or deforming in a lateral direction when subjected to the pressure of an accumulation of articles on the downstream conveyor, and flexing of the cable will serve to operate the valve to vary the flow of hydraulic fluid, and thereby vary the speed of the upstream conveyor.

When the accumulation is removed and the articles again return to the conveying system, the cable will return to a taut condition, thereby opening the valve to progressively increase the speed of the hydraulic motor associated with the upstream conveyor.

The modulating speed control is responsive to an accumulation of articles on one conveyor and serves to modulate or shut off the speed of the second conveyor depending on the magnitude of the accumulation. In most situations the system will be arranged so that an accumulation of articles on a downstream conveyor will operate to slow down or stop an upstream conveyor, however, the system can be designed so that an accumulation on an upstream conveyor will operate to vary the speed of a downstream conveyor.

The speed control mechanism of the invention is a simple mechanism which can be readily applied to existing conveying systems or to new installations. The mechanism can be applied to any type of conveyor or other transfer mechanisms which are utilized to handle or transport articles.

Other objects and advantages will appear in the course of the following description.

DESCRIPTION OF THE DRAWINGS

The drawings illustrate the best mode presently contemplated of carrying out the invention.

In the drawings:

FIG. 1 is a plan view of a conveying system utilizing the modulating speed control of the invention;

FIG. 2 is a side elevation of the conveying system of FIG. 1;

FIG. 3 is a view similar to FIG. 1, showing an accumulation of cans resulting in a deflection of the flexible guide cable;

FIG. 4 is an enlarged side elevation of the mechanism for connecting the cable to the valve control unit.

FIG. 5 is a view taken along line 5—5 of FIG. 4;

FIG. 6 is a plan view of a modified form of the invention; and

FIG. 7 is a side elevation of the structure shown in FIG. 6.

DESCRIPTION OF THE ILLUSTRATED EMBODIMENT

FIGS. 1 and 2 illustrate a portion of a conventional conveying system such as that utilized in a brewery or soft drink plant. The conveying system includes a pair of parallel conveyors 1 and 2 which can be constructed similar to that disclosed in U.S. Pat. No. 3,669,244.

Each of the conveyors 1 and 2 includes a frame or supporting structure 3 and endless link belts 4 are mounted for travel on the respective frames. Guide rails 5 and 6 are mounted on the frames 3 of the conveyors and serve to direct the flow of containers 7, which can be cans or bottles, from the upstream conveyor 1 to the downstream conveyor 2.

Each of the conveyor belts 4 is trained over a drive sprocket or knuckle 8 and an idler sprocket 9, both of which are connected to transverse shafts journalled within the frame 3. To drive each conveyor belt 4, a hydraulic motor 10 is employed, the drive shaft of which is coupled to the shaft carrying drive sprocket 8.

In accordance with the invention, a flexible cable or belt 11 is mounted over the end portion of conveyor 2 and is generally parallel to the guide rail 5. One end of the cable 11 is connected to a fixed bracket 12 mounted on the guide rail 6, while the opposite end of the cable 11 is operably connected to a valve assembly 13 which controls the flow of hydraulic fluid to the hydraulic motor 10 of conveyor 1. Valve assembly 13 is mounted on a bracket 14 secured to the frame 3 of the conveyor 2.

As illustrated in FIG. 4, the valve assembly 13 includes an outer casing or body 15, and the vertical leg of an L-shaped arm 16 is connected to the body while the horizontal leg of the arm 16 is spaced above the upper surface of the body. A bolt 17 is secured within a slot 18 in the end of the horizontal leg of arm 16 by means of washers 19 and nut 20.

A spool or pulley 21 is secured to the central portion of the bolt 17 and is provided with a pair of peripheral grooves 22 and 23. As best illustrated in FIG. 3, the cable 11 is located within the lower groove 22, and the cable is secured to the spool through a pin 24. As shown in FIGS. 4 and 5, the cable 11 is wound within groove 22 through approximately 180° and the end of the cable is inserted within a hole in the pin 24 and retained within the hole by brazing or welding, in the case of a metal cable, or by any suitable type of fastener.

A second cable 25 is located within the upper groove 23, and as illustrated in FIG. 5, the cable 25 extends approximately 180° within the groove and is wound in the opposite direction to that of cable 11. The free end of cable 25 is connected to the end of a stud 26 which extends through an opening 27 in the vertical leg of the L-shaped bracket 16. A spring 28 is located around the outer portion of the stud 26 and extends between the outer surface of the vertical leg of bracket 16 and a spring seat 29. Nut 30 is threaded on the outer end of the stud and serves to retain the spring seat in position.

As the cable 11 is deflected laterally outward by an accumulation of cans or articles 7, as shown in FIG. 3, the spool 21 will be rotated clockwise, as viewed in FIG. 5, thereby pulling the stud 26 inwardly of the bracket 16 against the force of spring 28. When the accumulation is ended, and the pressure of the cans 7 against the cable 11 is reudced, the force of the spring 28 will tend to rotate the spool counterclockwise and thereby return the cable 11 to the aut condition.

A stop in the form of a sleeve 31 an be mounted around the stud 26 and engagement of the spring seat 29 with the outer end of the sleeve 31 will serve as a stop to prevent further lateral deflection of the cable 11. The sleeve 31 can be utilized to limit or determine minimum flow of hydraulic fluid to the hydraulic motor 10 and prevent complete shut off of the fluid flow.

Secured to the bolt 17 beneath the spool 21 is a gear 32 and the hub 33 of the gear bears against the head 34 of the bolt. Gear 32 is engaged with a pinion 35 mounted on the vertical shaft 36. As shown in FIG. 4, the upper end of the shaft 36 is journalled within the horizontal leg of the L-bracket 16 and the lower portion of the shaft extends through an opening in a cover plate 37 which is bolted to the valve casing 15 by bolts 38.

The lower portion of shaft 36 is journalled within a sleeve 39 mounted within a vertical bore 40 in the casing 15, and the lower end of the shaft 36 is attached within a recess in a connector 41 by a cross pin 42 that extends through aligned openings in the connector and shaft. A thrust bearing assembly 43 is located between the upper end of connector 41 and the lower end of the sleeve 39.

The lower end of the connector 41 is provided with an axial recess 44, and the upper reduced end 45 of valve member 46 is mounted within the recess. Valve member 46 is located within bore 47 in the valve body 15, and the valve member is provided with an axial passage 48 which communicates at its upper end with a cross passage 49. The ends of cross passage 49 are aligned with ports 50 formed in the connector 41.

Hydraulic fluid is introduced into the valve body 15 through an inlet line 51 connected to passage 52, and openings 53 provide communication between the inlet passage 52 and the axial passage 48 of the valve member 46. The fluid is discharged from the valve body 15 through the outlet passage 54 which is connected by line 55 to the hydraulic motor 10.

When the ports 50 are in full registry with the cross passages 49, a full flow of hydraulic fluid is achieved from the inlet 52 to the outlet 54. As the cable 11 deflects, the spool 21 will rotate which will operate through the gears 32 and 35 to rotate the shaft 36 and connector 41, thereby moving the ports 50 out of full registry with the cross passage 49 to restrict the flow of fluid to the outlet 54 and slow down the operation of the motor 10. Conversely, rotation of the shaft 36 in the opposite direction will move ports 50 of connector 41 toward full registry with the cross passage 49, thereby increasing the flow of fluid through the valve and increasing the speed of the motor 10.

To provide an original adjustment of the fluid flow through valve body 15 for a taut condition of the cable 11, the outer end of the valve member 46 is provided with an adjusting nut 56. By turning the adjusting nut 56 the valve member 46 can be rotated with respect to connector 41 to provide the proper adjustment of fluid flow when the cable 11 is in a non-deflected condition. Depending upon the circumstances, this initial adjustment can be full fluid flow or a partial flow.

Under normal operating conditions the cable 11 will be taut and will serve as a guide for the cans or other other articles 7, moving from the conveyor 1 to the conveyor 2. In the event there is a blockage downstream the cans will accumulate on the conveyor 2 and the lateral pressure exerted by the accumulated cans will deflect the cable 11 laterally outward, as shown in FIG. 3. Deflection of the cable will act to rotate the spool 21 clockwise, as shown in FIG. 4, causing a corresponding rotation of gear 32 which will operate through gear 35 to rotate shaft 36 and connector 41. Rotation of connector 41 will move ports 50 away from full registry to reduce the flow of fluid through the valve body. By reducing the flow of fluid through the valve unit, the speed of the motor 10 will be correspondingly reduced Depending on the design of the system, maximum deflection of cable 11 can operate to completely shut off the flow of fluid to motor 10, or to reduce the flow to a predetermined minimum.

When the accumulation on conveyor 2 ceases and the cans 7 again flow along the conveyor, the force of the spring 28 will rotate the spool 21 counterclockwise to return the cable 11 toward the original condition. Rotation of the spool 21 will operate through the gears 32 and 35 and shaft 36 to increase the flow of fluid through the valve unit and correspondingly increase the speed of the motor 10.

FIGS. 6 and 7 illustrate a modified form of the invention and illustrate a conveyor 57, similar in construction to conveyors 1 and 2 of the first embodiment. The conveyor 57 includes a frame or supporting structure 58 and an endless link belt 59 is mounted for travel on the frame 58 in the direction of the arrow.

A pair of guide rail assemblies 60 and 61 are connected to the frame 58 and are located on opposites sides of the belt 59 and serve to guide the cans or other articles 7 in travel on the belt. Each guide rail assembly 60 and 61 is composed of a pair of guide rails 62 which are supported by brackets 63 from the frame 58.

As illustrated in FIG. 6, a section of the guide rail assembly 60 is bent outwardly, as indicated by 64, and a cable 65, similar to cable 11, is mounted above the side edge of the conveyor belt 59 and is located inwardly of the bent section 64.

One end of the cable 65 is fixed by means of a hold down 66 to one of the brackets 63 of the guide rail assembly 60. Cable 65 is trained over a pair of spools 67 and 68, each of which is mounted on a shaft 69 supported between the guide rails 62 of the guide rail assembly 60.

The opposite end of the cable 65 is connected to a valve assembly 70, similar to valve assembly 13, of the first embodiment.

When the articles or cans 7 accumulate on the conveyor belt 55 due to a blockage downstream, the pressure exerted by the accumulated cans will deflect the cable 65 laterally outward, thereby causing a variation in the flow of hydraulic fluid through the valve assembly 13, as previously described. The fluid output from the valve assembly 13 can be connected to a hydraulic drive of a second conveyor, not shown, located either upstream or downstream of the conveyor 57.

The speed control mechanism of the invention is a simple and inexpensive unit that can be applied to either existing conveying systems or to new installations. While the drawings illustrate the system utilized with a pair of belt conveyors, it is contemplated that the control unit can be utilized with any type of transfer or conveying mechanism. The term "transfer unit" as used in the claims is intended to mean any type of conveyor or other mechanism for moving, transferring, or conveying articles.

The unit is responsive to an accumulation of cans or other articles to modulate the speed of the conveying system, or in some instances to completely shut off the power to a conveyor either upstream or downstream of the accumulation.

Various modes of carrying out the invention are contemplated as being within the scope of the following claims particularly pointing out and distincly claiming the subject matter which is regarded as the invention.

I claim:

1. An apparatus for moving articles, a first transfer unit for moving articles, a second transfer unit for moving articles, guide means disposed above said transfer units for guiding the articles from the first transfer unit to the second transfer unit, said guide means including a movable guide member associated with a first of said transfer units, said guide member being mounted for movement with respect to the first transfer unit in response to pressure exerted by an accumulation of said articles on said first transfer unit, fluid power-operated drive means operably connected to the second of said transfer units for driving said second transfer unit, control means for controlling the flow of fluid to said drive means and including a rotary valve element, a rotatable member means connecting said rotatable member to said guide member in a manner such that movement of said guide member acts to rotate said rotatable member, and means operably connecting said rotatable member to said rotary valve element whereby rotation of said rotatable member will cause rotation of said valve element to vary the flow of fluid to said drive means.

2. The apparatus of claim 1, wherein said first and second transfer units are conveyors and the first conveyor is located downstream of the second conveyor.

3. The apparatus of claim 1, wherein the guide member is flexible and is mounted for lateral deflection with respect to the first transfer unit.

4. The apparatus of claim 3, wherein one end of said flexible guide member is fixed and the opposite end of the flexible guide member is connected to said rotatable member.

5. The apparatus of claim 1, wherein movement of said guide member acts to rotate the rotatable member in one direction, said apparatus also including biasing means connected to the rotatable member for rotating the rotatable member in the opposite direction.

6. The apparatus of claim 5, wherein said guide member comprises a flexible cable disposed circumferentially around the rotatable member and said biasing means comprises a spring.

7. The apparatus of claim 1, wherein said connecting means comprises gear means.

8. In a conveying system, a first conveyor for conveying articles in a path of travel, a second conveyor for conveying articles in a path of travel, guide means disposed above the conveyor for guiding the articles from the first conveyor to the second conveyor, said guide means including a flexible guide member, said guide member being associated with the first of said conveyors, one end of said guide member being fixed and said guide member being mounted for lateral deflection with respect to said first conveyor, hydraulic operated drive means operably connected to the second of said conveyors, valve control means for controlling the flow of hydraulic fluid to said drive means and including a rotary valve element, means maintaining the guide member in a taut non-deflected condition, lateral outward pressure of an accumulation of articles on said first conveyor causing deflection of said guide member, a rotatable member, said means connecting said rotatable member to said guide member in a manner such that movement of said guide member acts to rotate said rotatable member, and means operably connecting said rotatable member to said rotary valve element whereby rotation of said rotatable member will cause rotation of said valve element to vary the flow of fluid to said drive means.

9. The conveying system of claim 8, wherein the conveyors are link belt conveyors, and said first conveyor is located downstream of said second conveyor.

10. The conveying system of claim 8, wherein the means maintaining the guide member in a taut condition comprises spring means connected to said rotatable member.

11. The conveying system of claim 8, wherein said guide member when in the non-deflected condition is disposed generally parallel to a side edge of said first conveyor and is spaced laterally inward of said side edge.

12. The conveyor system of claim 8, wherein said valve control means includes adjusting means operably connected to said valve element to adjust the position of said valve element and establish a given rate of flow of the fluid through said valve control means for said taut condition of said guide member.

* * * * *

UNITED STATES PATENT AND TRADEMARK OFFICE
CERTIFICATE OF CORRECTION

PATENT NO. : 3,929,218
DATED : December 30, 1975
INVENTOR(S) : ROBERT F. RISLEY

It is certified that error appears in the above-identified patent and that said Letters Patent are hereby corrected as shown below:

Column 5, Line 46 (CLAIM 1) After "member" first occurrence, insert ---,--- (a comma), Column 6, Line 33, (CLAIM 8), Cancel "said"

Signed and Sealed this twenty-seventh Day of April 1976

[SEAL]

Attest:

RUTH C. MASON
*Attesting Officer*

C. MARSHALL DANN
*Commissioner of Patents and Trademarks*